United States Patent [19]

Ioki et al.

[11] Patent Number: 5,171,601
[45] Date of Patent: Dec. 15, 1992

[54] ICE CREAM AND METHOD OF MANUFACTURING

[75] Inventors: Kazuhiro Ioki; Shingo Suzuki, both of Himeji, Japan

[73] Assignee: Ioki Eiyo Kabushiki Kaisha, Japan

[21] Appl. No.: 772,266

[22] Filed: Oct. 7, 1991

[30] Foreign Application Priority Data

Oct. 8, 1990 [JP] Japan .................................. 2-271410

[51] Int. Cl.⁵ .......................... A23G 9/02; A23G 9/04
[52] U.S. Cl. .................... 426/565; 426/271; 426/804; 426/567
[58] Field of Search ............... 426/100, 101, 565, 566, 426/567, 271, 804

[56] References Cited

U.S. PATENT DOCUMENTS

| | | | |
|---|---|---|---|
| 4,244,981 | 1/1981 | Blake | 426/567 |
| 4,307,123 | 12/1981 | Bundus | 426/565 |
| 4,894,242 | 1/1990 | Mitchell et al. | 426/565 |
| 4,908,223 | 3/1990 | Murtaugh et al. | 426/565 |
| 4,981,709 | 1/1991 | Furcsik et al. | 426/565 |

FOREIGN PATENT DOCUMENTS

| | | | |
|---|---|---|---|
| 3269957 | 11/1988 | Japan | 426/565 |
| 1023869 | 1/1989 | Japan | 426/565 |
| 86/02809 | 5/1986 | World Int. Prop. O. | 426/566 |

*Primary Examiner*—Jeanette Hunter
*Attorney, Agent, or Firm*—Marshall, O'Toole, Gerstein, Murray & Bicknell

[57] ABSTRACT

An ice cream having a mix base of rice flour, ion-exchanged water sugar and skimmed milk and a seasoning component of cream, liqueur and one of egg yolk, tea and coffee and a flavoring component.

15 Claims, No Drawings

ICE CREAM AND METHOD OF MANUFACTURING

FIELD OF THE INVENTION

The present invention relates to a novel ice cream, particularly to an ice cream containing a rice flour, and a method of manufacturing the ice cream.

BACKGROUND AND PRIOR ART

Recently, ice cream manufacturers have had the difficult task of attempting to develop ice creams having both taste and nutritive constitution for responding to consumer's diverse tastes and the growth of the consumer's interest for figure (beauty) and health.

A conventional ice cream, e.g., a vanilla ice cream, is generally produced by using relatively large amounts of sugar (granulated sugar), butterfat (milk), fresh cream, and the like, such as shown in the following Table 1.

TABLE 1

|  | AMOUNT |
|---|---|
| INGREDIENTS (A) | |
| Milk (Fat 3.2%) | 550 g |
| Fresh Cream (Fat 45%) | 180 g |
| Granulated Sugar | 145 g |
| Glucose | |
| Egg Yolk | 60 g |
| Skim Milk Powder | 45 g |
| Stabilizers | 7 g |
| INGREDIENTS (B) | |
| Milk | 100 g |
| Vanilla beans | 0.5 bottle |
| COINTREAU | 6 g |
|  | 13 g |

A conventional method of manufacturing the ice cream comprises the steps of:

(1) mixing the ingredients (A) of Table 1 in a bowl;

(2) pasteurizing the mixture prepared by the step (1) in an ice cream pasteurizer (Mixed Ingredient Stirring-Heating Device), and conducting a high-temperature sterilization and an alpha treatment simultaneously;

(3) aging and cooling said heated mixture prepared by the step (2) in an aging pad (Mixed Ingredient Cooling-Aging Device), to prepare a yellow base, e.g., 1,000 g (butterfat 3.5%; solids-not-fat 9.2%);

(4) carefully adding the ingredients (B), one by one, to the yellow base and mixing therewith;

(5) cooling the mixture prepared by the step (4) in an ice cream freezer for five to ten minutes; and (6) preserving the prepared ice cream in a refrigerator (freezer).

SUMMARY OF THE INVENTION

Since the aforementioned conventional ice cream is rich in fat and sugar, and has high nutritive value (calories), said ice cream would not satisfy the consumer's taste and is not preferable for figure and health.

In this art, it has been long desired to provide a low-calorie ice cream having a taste acceptable by most, if not all consumers, which also has an excellent nutritive balance Responding to this long felt need in the art, the present invention provides a novel ice cream, and a new method of manufacturing the ice cream, having an ideal nutritive constitution, e g., a very small quantity of fat; a reduced calorie content of less than about half of a conventional ice cream; enriched natural sugars; a fresh flavor, and the taste of one or more selected seasoning ingredients to respond to the diversity of consumers' taste and their interest for figure and health.

More particularly, the present invention is directed to an ice cream composition and method of manufacturing the ice cream including introducing rice flour into other components of the ice cream, and further includes the following aspects of the invention.

In accordance with one aspect of the present invention, an ice cream composition is made from;

a mix base containing a rice flour, a low-fat (e.g., 2% by weight or less) milk, an alkali ion-exchanged (soft) water, a granulated sugar and a skimmed (1% by weight or less fat) milk;

seasoning components comprising a low-fat fresh cream containing about 21.8% by volume fat or less (0.8% by volume butter fat or less), a liqueur, and a seasoning component selected from the group consisting of an egg yolk, a ground tea powder, and a coffee paste; and one or more additional flavoring components.

In accordance with another aspect of the present invention, an ice cream composition is prepared from a basic ice cream mix base, as described immediately above, wherein said mix base further contains a fruit juice, and said seasoning ingredient is a combination of a low-fat fresh cream, a liqueur and lemon juice.

In accordance with still another aspect of the present invention, an ice cream composition is prepared including an ice cream mix base and a combination of seasoning ingredients comprising yogurt, a syrup, and lemon juice.

In accordance with a further aspect of the present invention, an ice cream composition is prepared to include the mix base together with fruit juice, and said seasoning component comprises a combination of a liqueur and lemon water.

In accordance with an aspect, the manufacturing process for producing the ice creams of the present invention includes the steps of:

(a) mixing the ingredients of the mix base;

(b) heating-stirring the mix base prepared by step (a) and then cooling-stirring said mixture to provide the mix base;

(c) adding seasoning components, preferably one by one, to the mix base prepared by step (b), and mixing all components together;

(d) adding the flavoring component(s) to the mixture prepared by step (c), and mixing therewith; and (e) preserving the mixture prepared by the step (d) by cooling, e.g., in a refrigerator.

The present invention will become apparent from the following detailed description of the ice cream and manufacturing method of the present invention.

EXAMPLES

Example 1: Vanilla Ice Cream

The following Table 2 refers to the amounts of the ingredients required for producing the vanilla ice cream (1 liter), where amounts of each ingredients is per liter of ice cream:

TABLE 2

| INGREDIENTS (A) | AMOUNT |
| --- | --- |
| Rice Flour* | (pref.) 100 g |
| | (range) 70 to 120 g |
| Low-Fat Milk | (pref.) 320–400 cc |
| Alkali Ion | (pref.) 350 cc |
| Water** | (range) 320 to 400 cc |
| Granulated Sugar | (pref.) 30–80 g |
| Skimmed Milk | (pref.) 100 g |
| | (range) 90 to 120 g |
| INGREDIENTS (B) | |
| Low-Fat Fresh Cream | (pref.) 100 g |
| | (range) 50 to 120 g |
| Egg Yolk | (pref.) about 30 g |
| (one egg; L size) | (range) 20 to 40 g |
| Liqueur 1*** | (pref.) 20 cc |
| | (range) 15 to 30 cc |
| Liqueur 2**** | (pref.) 10 cc |
| | (range) 5 to 20 cc |
| INGREDIENTS (C) | |
| Beans Powder | (pref.) 1 g |
| | (range) 0.5 to 3 g |
| Vanilla Flavor | (pref.) 1 g |
| | (range) 0.5 to 3 g | cf: *Nonglutinous rice ground by a stamp method and classified by a sieve (preferably 80-mesh, U.S. Sieve Size) was used.
**Automatic Alkali Ion Water Preparing Device (Water Purifying System) was used to electrolytically ion exchange tap water and the water collected at the negative pole.
***BELISE (Tradename)
****GRAND MARNIER (Tradename)

Manufacturing Process of the Vanilla Ice Cream (1) The Ingredients (A) described in Table 2 were put into a bowl and mixed together.

The mixture was pasteurized in an ice cream pasteurized (Mixed Ingredient Stirring-Heating Device) equipped with a stirring paddle and all ingredients were stirred thoroughly therein; thereafter all ingredients were sterilized at a high temperature (80° C.; instantly) to sufficiently accelerate any chemical reaction (alpha-treatment) thereof.

While continuing stirring, the mixture (A) was aged and cooled in an ice cream aging pad (Mixed Ingredient Cooling-Aging Device) and the mixture was cooled to an ingredient temperature of about 5° C. to complete preparation of a mix base.

(2) The Ingredients (B) described in Table 2 were added to the mix base prepared according to (1) above, one by one (in order of the highest viscosity components added first), and mixed therewith. In the Ingredients (B), the egg yolk, the low-fat fresh cream, and the liqueur 1 or the liqueur 2 were added in this order. Since the viscosity of each of the Ingredients (B) is substantially different, the addition and the mixing of each of the ingredients without separately is preferred.

(3) The Ingredients (C) described in Table 2 were added to the mixture prepared according to (2) above and mixed therewith, while stirring-cooling the mixture for about five to about eight minutes in an ice cream freezer (Italian Gelato Manufacture Type including a high speed agitation blade capable of quickly coding the composition) at a temperature of about −18° C. (±2° C.) or lower. The freezing time was set to bring an overrun of about 120–130%, wherein overrun is defined as:

$$\text{overrun} = \frac{\text{air-containing ice cream (volume)}}{\text{ice cream without air (volume)}} \times 100$$

(4) The ice cream prepared according to (1) through (3) was preserved in an airtight container to prevent the surface of the ice cream from being dried.

Example 2: Strawberry Ice Cream

The following Table 3 refers to the amounts of the ingredients required for producing a strawberry ice cream (1 liter), where the amount of each ingredient is per liter of ice cream:

TABLE 3

| INGREDIENTS (A) | AMOUNT |
| --- | --- |
| Rice Flour* | (pref.) 100 g |
| | (range) 70 to 120 g |
| Low-Fat Milk | (pref.) 320–400 cc |
| Alkali Ion | (pref.) 350 cc |
| Water** | (range) 300 to 380 cc |
| Granulated Sugar | (pref.) 30–80 g |
| Skimmed Milk | (pref.) 100 g |
| Strawberry Puree | (range) 50 to 120 g |
| (Additives; 100%) | (pref.) 200 cc |
| | (range) 180 to 250 g |
| INGREDIENTS (B) | |
| Low-Fat Fresh Cream | (pref.) 50–100 cc |
| Lemon Juice | (pref.) 5 cc |
| | (range) 3 to 10 cc |
| Liqueur | (pref.) 50 cc |
| (Strawberry Liqueur) | (range) 40 to 60 cc |
| INGREDIENTS (C) | |
| Strawberry Flavor | (pref.) 5 cc |
| | (range) 3 to 6 cc | cf: *Nonglutinous rice ground by a stamp method and classified by a sieve (preferably 80-mesh, U.S. Sieve Size) was used.
**Automatic Alkali Ion Water Preparing Device (Water Purifying System) was used.

The strawberry ice cream was produced in accordance with the manufacturing method for vanilla ice cream as described in Example 1.

Example 3: Ground Tea Ice Cream

The following Table 4 refers to the amounts of the ingredients required for producing a ground tea ice cream (1 liter), where the amount of each ingredient is per liter of ice cream:

TABLE 4

| INGREDIENTS (A) | AMOUNT |
| --- | --- |
| Rice Flour* | (pref.) 100 g |
| | (range) 70 to 120 g |
| Low-Fat Milk | (pref.) 320–400 cc |
| Alkali Ion | (pref.) 350 cc |
| Water** | (range) 300 to 380 cc |
| Granulated Sugar | (pref.) 30–80 g |
| Skimmed Milk | (pref.) 100 g |
| | (range) 90 to 130 g |
| INGREDIENTS (B) | |
| Low-Fat Fresh Cream | (pref.) 50–100 cc |
| Ground Tea Powder | (pref.) 7 cc |
| | (range) 5 to 12 cc |
| Liqueur | (pref.) 50 cc |
| (Ground Tea Liqueur) | (range) 40 to 60 cc |
| INGREDIENTS (C) | |
| Ground Tea Flavor | (pref.) 5 cc |

TABLE 4-continued

| | AMOUNT |
|---|---|
| | (range) 3 to 6 cc | cf: *Nonglutinous rice ground by a stamp method and classified by a sieve (preferably 80-mesh, U.S. Sieve Size) was used.
**Automatic Alkali Ion Water Preparaing Device (Water Purifying System) was used.

The ground tea ice cream was produced in accordance with the manufacturing method for vanilla ice cream as described in Example 1.

Example 4: Capchino Ice Cream

The following Table 5 refers to the amounts of the ingredients used to produce a capchino ice cream (1 liter), where the amount of each ingredient is per liter of ice cream:

TABLE 5

| | AMOUNT |
|---|---|
| INGREDIENTS (A) | |
| Rice Flour* | (pref.) 100 g |
| | (range) 70 to 120 g |
| Low-Fat Milk | (pref.) 320–400 cc |
| Alkali Ion Water** | (pref.) 350 cc |
| | (range) 320 to 400 cc |
| Granulated Sugar | (pref.) 30–80 g |
| Skimmed Milk | (pref.) 100 g |
| | (range) 80 to 120 g |
| INGREDIENTS (B) | |
| Low-Fat Fresh Cream | (pref.) 50–100 cc |
| Coffee Paste | (pref.) 15 g |
| | (range) 10 to 20 g |
| Liqueur (KAAHLUA) | (pref.) 50 cc |
| | (range) 40 to 60 cc |
| INGREDIENT (C) | |
| Coffee Flavor | (pref.) 5 cc |
| | (range) 3 to 6 cc | cf: *Nonglutinous rice ground by a stamp method and classified by a sieve (preferably 80-mesh, U.S. Sieve Size) was used.
**Automatic Alkali Ion Water Preparing Device (Water Purifying System) was used.

The capchino ice cream was produced in accordance with the producing method of vanilla ice cream described in Example 1.

Example 5: Yogurt Ice Cream

The following Table 6 refers to the amounts of the ingredients required for producing a yogurt ice cream (1 liter), where the amount of each ingredient is per liter of ice cream:

TABLE 6

| | AMOUNT |
|---|---|
| INGREDIENTS (A) | |
| Rice Flour* | (pref.) 100 g |
| | (range) 70 to 120 g |
| Low-Fat Milk | (pref.) 320–400 cc |
| Alkali Ion Water** | (pref.) 350 cc |
| | (range) 300 to 380 g |
| Granulated Sugar | (pref.) 30–80 g |
| Skimmed Milk | (pref.) 100 g |
| | (range) 80 to 120 g |
| INGREDIENTS (B) | |
| Syrup (Alkali Ion Water and Granulated Sugar) | (pref.) 120 cc |
| | (range) 80 to 130 cc |
| Lemon Juice | (pref.) 20 cc |
| | (range) 15 to 50 cc |
| Yogurt (Natural Type) | (pref.) 500 cc |
| | (range) 480 to 550 cc |
| INGREDIENT (C) | |

TABLE 6-continued

| | AMOUNT |
|---|---|
| Yogurt Flavoring | (pref.) 5 cc |
| | (range) 3 to 6 cc | cf: *Nonglutinous rice ground by a stamp method and classified by a sieve (preferably 80-mesh, U.S. Sieve Size) was used.
**Automatic Alkali Ion Water Preparing Device (Water Purifying System) was used.

The yogurt ice cream was produced in accordance with the manufacturing method for vanilla ice cream as described in Example 1.

Example 6: Valencia Orange Ice Cream

The following Table 7 refers to the amounts of the ingredients required for producing a valencia orange ice cream (1 liter), where the amount of each ingredient is per liter of ice cream:

TABLE 7

| | AMOUNT |
|---|---|
| INGREDIENTS (A) | |
| Rice Flour* | (pref.) 100 g |
| | (range) 70 to 120 g |
| Valencia Orange (Fruit Juice; 100%) | (pref.) 100 cc |
| | (range) 80 to 150 cc |
| Alkali Ion Water** | (pref.) 520 cc |
| | (range) 450 to 550 cc |
| Granulated Sugar | (pref.) 80 g |
| | (range) 40 to 90 g |
| Valenia Orange Puree | (pref.) 300 cc |
| | (range) 280 to 350 cc |
| INGREDIENTS (B) | |
| Lemon Water | (pref.) 10 cc |
| | (range) 5 to 12 cc |
| Liqueur (Orange Liqueur) | (pref.) 50 cc |
| | (range) 40 to 60 cc |
| INGREDIENT (C) | |
| Valencia Orange Flavoring | (pref.) 5 cc |
| | (range) 3 to 6 cc | cf: *Nonglutinous rice ground by a stamp method and classified by a sieve (preferably 80-mesh, U.S. Sieve Size) was used.
**Automatic Alkali Ion Water Preparing Device (Water Purifying System) was used.

The valencia orange ice cream was produced in accordance with the manufacturing method for vanilla ice cream as described in Example 1.

Example 7: Nutritive Constitution Analysis of Vanilla Ice Cream of the Present Invention The vanilla ice cream of the present invention was analyzed for the nutritive constitution thereof, and analysis results are shown in the following Table 8.

TABLE 8

| ITEM | RESULT | METHOD OF ANALYSIS |
|---|---|---|
| Water | 71.5% | Heating-Drying Under Reduced Pressure |
| Protein | 3.7% | Kjeldahl Method (*1) |
| Lipid | 2.8% | Rose-Gottlieb Method |
| Fiber | Not Detected | Henneberg-Stohmann Method |
| Ash | 0.6% | Direct Ash Method |
| Sugar | 21.4% | (*2) |
| Energy | 126k cal/100 g | (*3) | cf: *1 Nitrogen-Protein reduced coefficient: 6.25
*2 100-(Water + Protein + Lipid + Fiber + Ash)
*3 Energy reduced coefficient: Protein: 4; Lipid: 9; Carbohydrate (Fiber + Sugar): 4

Comparative Example 1: Nutritive Constitution Analysis of Conventional Vanilla Ice Cream The conventional vanilla ice cream of Table 1 was analyzed for the nutritive constitution thereof, and analysis results are shown in the following Table 9.

TABLE 9

| ITEM | RESULT | METHOD |
| --- | --- | --- |
| Water | 56.1% | Heating-Drying Under Reduced Pressure |
| Protein | 4.1% | Kjeldahl Method (*1) |
| Lipid | 17.2% | Rose-Gottlieb Method |
| Fiber | Not Detected | Henneberg-Stohmann Method |
| Ash | 0.9% | Direct Ash Method |
| Sugar | 21?% | (*2) |
| Energy | 258k cal/100 g | (*3) | cf: *1 Nitrogen-Protein reduced coefficient: 6.25
*2 100-(Water + Protein + Lipid + Fiber + Ash)
*3 Energy reduced coefficient: Protein: 4; Lipid: 9; Carbohydrate (Fiber + Sugar): 4

As apparent from the Table 8 (Example 7) and Table 9 (Comparative Example 1), the ice cream of the present invention has a remarkably reduced lipid content as well as a substantially reduced calorie content of less than half of the conventional ice cream.

Although the ice cream of the present invention and that of the conventional ice cream contain similar amounts of the sugar, since the sugar of the conventional ice cream is substantially a granulated sugar, in contrast thereto, the sugars utilized in the ice cream of the present invention include a small amount of the granulated sugar, and a predominant amount of sugar derived from the starch of rice flour, and sugars derived from fruits, flavorings and the like, resulting in substantial differences in the constitution of the sugar of the ice cream of the present invention.

The ice creams of the present invention are substantially improved in nutritive constitution over conventional ice creams; have substantially less fat; substantially fewer calories owing to only about 30 to about 80 grams per liter granulated sugar; while having improved taste over conventional ice creams, primarily due to including rice flour; low-fat milk; low-fat fresh cream; purified (alkali ion) water; and fruit juice.

In order to combine the rice flour into other ice cream components, to achieve the full advantage of the present invention, it has been found that the following manufacturing procedures and conditions should be followed:

(1) The rice flour should be prepared to have an appropriate particle sizes by grinding the rice, to a particle size of about 80 to about 120 microns.

(2) The ice cream component heating treatment should heat the components quickly to a temperature of at least about 70° C., preferably at least about 80° C., to prevent the rice flour from solidification; and (3) The ice cream ingredients should be pasteurized while stirring all of the ingredients homogeneously in a stirring tank to improve the mixability of the rice flour with the other ice cream ingredients.

What is claimed is:

1. An ice cream comprising:
   a mix base containing rice flour, low-fat milk, an alkali ion-exchanged water, a granulated sugar and a skimmed milk;
   seasoning components including a low-fat fresh cream, a liqueur, and a component selected from the group consisting of egg yolk, ground tea powder, and coffee; and
   a flavor.

2. The ice cream according to claim 1, wherein said mix base further includes a fruit juice, and said seasoning components comprise a combination of a low-fat fresh cream, the liqueur and lemon juice.

3. The ice cream according to claim 2, wherein said seasoning components comprise a combination of a yogurt, a syrup, and lemon juice.

4. The ice cream according to claim 2, wherein said mix base further includes fruit juice, and said seasoning components include a liqueur and lemon juice.

5. A method for producing ice cream comprising the steps of:
   (a) mixing rice flour, a low-fat milk, an alkali ion exchanged water, a granulated sugar and a skimmed milk;
   (b) heating to a temperature of at least about 70° C. and a stirring a mixture prepared by step (a), and cooling and stirring said mixture to provide a mix base;
   (c) adding seasoning components containing a low-fat fresh cream, a liqueur, and a component selected from the group consisting of egg yolk, ground tea powder, and coffee, one by one, to the mix base prepared by step (b), and mixing therewith;
   (d) adding a flavoring component to the mixture prepared by step (c) and mixing therewith; and
   (e) preserving the mixture prepared by step (d) in a refrigerator at a temperature of about −18° C. or lower.

6. The method according to claim 5, wherein said mix base further includes a fruit juice, and said seasoning components are a combination of low-fat fresh cream, liqueur and lemon juice.

7. The method according to claim 5, wherein said seasoning components included a combination of yogurt, a syrup, and lemon juice.

8. The method according to claim 5, wherein said mix base further includes fruit juice, and said seasoning components comprise a combination of the liqueur and a lemon juice.

9. The method according to claim 5, wherein step (b) is carried out at a temperature of at least about 80° C.

10. The method according to claim 5, wherein the rice flour has a particle size of about 80 microns to about 120 microns.

11. The ice cream according to claim 1, where amounts indicated are per liter of ice cream, wherein:
   the rice flour is included in an amount of 70 to 120 grams; the low-fat milk is included in an amount of 320 to 400 grams; the alkali ion-exchanged water is included in an amount of 300 to 550 grams; the granulated sugar is included in an amount of 30 to 90 grams; and the skimmed milk is included in an amount of 80 to 130 grams.

12. An ice cream comprising:
   a mix base containing effective amounts of rice flour, an alkali ion-exchanged water, and a granulated sugar, seasoning components; and
   a flavor.

13. The ice cream according to claim 12 where amounts are per liter of ice cream, wherein:
   the rice flour is included in an amount of 70 to 120 grams; the alkali ion-exchanged water is included in an amount of 300 to 550 grams; and the granulated sugar is included in an amount of 30 to 90 grams.

14. A method for producing ice cream comprising the steps of:
   (a) mixing rice flour, an alkali ion exchanged water, and a granulated sugar;
   (b) heating to a temperature of at least about 70° C. and stirring a mixture prepared by step (a), and cooling and stirring said mixture to provide a mix base;
   (c) adding a flavoring component to the mixture prepared by step (b) and mixing therewith; and
   (d) preserving the mixture prepared by step (c) in a refrigerator at a temperature of about −18° C. or lower.

15. The method according to claim 14, wherein the rice flour has a particle size of about 80 microns to about 120 microns.

* * * * *

UNITED STATES PATENT AND TRADEMARK OFFICE
CERTIFICATE OF CORRECTION

PATENT NO. : 5,171,601
DATED : December 15, 1992
INVENTOR(S) : Kazuhiro Ioki, et. al.

It is certified that error appears in the above-indentified patent and that said Letters Patent is hereby corrected as shown below:

Column 1, line 64, after "balance" insert --. --; and

Column 2, line 67, after "each" delete "ingredients" and substitute therefor -- ingredient --.

Signed and Sealed this

Twenty-first Day of December, 1993

Attest:

BRUCE LEHMAN

Attesting Officer  Commissioner of Patents and Trademarks

UNITED STATES PATENT AND TRADEMARK OFFICE
CERTIFICATE OF CORRECTION

PATENT NO. : 5,171,601

DATED : December 15, 1992

INVENTOR(S) : KAZUHIRO IOKI, ET AL.

It is certified that error appears in the above-identified patent and that said Letters Patent is hereby corrected as shown below:

Title page, /73/ Assignee: after "Eiyo" insert --Kogyo--;

Column 1, line 28, in Table 1, opposite "Glucose" in the "AMOUNT" column, insert -- 13 g --;

Column 1, line 37, in Table 1, in the "AMOUNT" column, delete "13 g";

Column 1, line 64, after "balance" insert -- . --; and

Column 2, line 67, after "each" delete "ingredients" and substitute therefor -- ingredient --.

This certificate supersedes the Certificate of Correction issued on December 21, 1993.

Signed and Sealed this

Fifth Day of April, 1994

Attest:

BRUCE LEHMAN

*Attesting Officer*        *Commissioner of Patents and Trademarks*

UNITED STATES PATENT AND TRADEMARK OFFICE
CERTIFICATE OF CORRECTION

PATENT NO.   : 5,171,601
DATED        : December 15, 1992
INVENTOR(S)  : KAZUHIRO IOKI ET AL.

It is certified that error appears in the above-indentified patent and that said Letters Patent is hereby corrected as shown below:

Column 1, line 28, in Table 1, opposite "Glucose" in the "AMOUNT" column, insert -- 13g --;

Column 1, line 37, in Table 1, in the "AMOUNT" column, delete "13 g".

Signed and Sealed this

Twenty-sixth Day of April, 1994

Attest:

BRUCE LEHMAN

Attesting Officer       Commissioner of Patents and Trademarks